United States Patent Office 2,889,353
Patented June 2, 1959

2,889,353

ALKAMINE ESTERS OF α-(Δ¹-CYCLOALKENYL)-β-HYDROXY-ALIPHATIC ACIDS AND PREPARATION THEREOF

Frederick F. Blicke, Ann Arbor, Mich., assignor to Regents of The University of Michigan, Ann Arbor, Mich., a corporation of Michigan No Drawing. Application December 14, 1955
Serial No. 552,976

12 Claims. (Cl. 260—468)

This invention relates to tertiary-amino-lower-alkyl viz., alkamine esters of α-(Δ¹-cycloalkenyl)-β-hydroxy-aliphatic acids, in which the cycloalkenyl group has five or six ring carbons, and the aliphatic acid is an alkanoic or cycloalkylacetic acid having from three to about twelve carbon atoms. The invention also relates to a method for the preparation of these compounds.

Alkamine esters of α-aryl-β-hydroxy-aliphatic acids are known [Blicke and Raffelson, J. Am. Chem. Soc. 74, 1730-3 (1952)]. The only known practicable method for preparing the requisite α-aryl-β-hydroxy-aliphatic acids is by a Grignard-type reaction between a carbonyl compound and a salt of the halomagnesium derivative of an arylacetic acid. Until the time of the present invention it was believed that the presence of an α-aryl group was prerequisite to the formation of a halomagnesium derivative through activation of an α-hydrogen atom of the arylacetic acid. Surprisingly, it has now been found that suitable salts of Δ¹-cycloalkenylacetic acids also form halomagnesium derivatives which react with aliphatic carbonyl compounds to form α-(Δ¹-cycloalkenyl)-β-hydroxy-aliphatic acids.

A preferred aspect of the invention relates to compounds having the formula

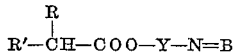

wherein R represents a Δ¹-cycloalkenyl group having five or six ring carbons, Y represents a lower-alkylene bridge having from two to about five carbon atoms in which the free valences are on different carbon atoms, N=B represents an aliphatic tertiaryamino group, and R' represents a 1-hydroxy-lower-alkyl group or a 1-hydroxy-cycloalkyl group.

In the above structural formula, R represents a Δ¹-cycloalkenyl group having five or six ring carbons and thus includes Δ¹-cyclopentenyl and Δ¹-cyclohexenyl, and lower-alkylated derivatives of these. The lower-alkylated Δ¹-cycloalkenyl groups can contain from one to three lower-alkyl substituents having from one to about four carbon atoms, thus including such groups as 3-methyl-Δ¹-cloclopentenyl, 4-methyl-Δ¹-cyclohexenyl, 3,4-dimethyl-Δ¹-cyclohexenyl, 3,4,5-trimethyl-Δ¹-cyclohexenyl, 4-ethyl-Δ¹-cyclopentenyl, 3-butyl-Δ¹-cyclohexenyl, and the like.

In the above structural formula, Y represents a lower-alkylene bridge having from two to about five carbon atoms in which the free valences are on different carbon atoms, and thus includes the straight chain polymethylene radicals, $(CH_2)_n$, where $n$ is 2–5, and branched chain radicals including such groups as —CH(CH₃)CH—, —CH(C₂H₅)CH—, —C(CH₃)₂CH₂—

—CH(CH₃)CH(CH₃)— and —CH(CH₃)CH₂CH₂—.

In the above structural formula, N=B represents an aliphatic tertiary-amino group. As is well-known in the field of antispasmodic-type alkamine esters, the exact nature of the tertiary-amino group is not critical. Preferred types of tertiary-amino groups include di-lower-alkylamino radicals and related cyclo-aliphatic types such as 1-piperidyl, 1-pyrrolidyl, and 4-morpholinyl radicals, and lower-alkylated derivatives thereof. The alkyl groups of the di-lower-alkylamino radicals each have from one to about six carbon atoms and can be the same or different and straight or branched. Illustrative of the group N=B are the following: dimethylamino, diethylamino, methylethylamino, dipropylamino, diisopropylamino, dibutylamino, dipentylamino, dihexylamino, 1-piperidyl, 1-pyrrolidyl, 4-morpholinyl, 2,6-dimethyl-1-piperidyl, 3-ethyl-1-pyrrolidyl, 2-methyl-4-morpholinyl, and the like.

In the above structural formula, R' represents a 1-hydroxy-lower-alkyl group or a 1-hydroxycycloalkyl group. The numeral 1 of 1-hydroxyalkyl or 1-hydroxycycloalkyl means that the hydroxy group is attached to the first carbon atom of the alkyl or cycloalkyl group which is the carbon atom immediately adjacent to the carbon atom bearing the cycloalkenyl substituent R. When R' is a 1-hydroxyalkyl group it preferably contains from one to about nine carbon atoms and may be straight or branched, thus including such groups as hydroxymethyl, 1-hydroxyethyl, 1-hydroxypropyl, 1-hydroxy-1-methylethyl, 1-hydroxy-1-ethylpropyl, 1-hydroxy-1-methylpropyl, 1-hydroxy-2-methylbutyl, 1-hydroxyhexyl, 1-hydroxyheptyl, 1-hydroxynonyl, and the like. When R' represents a 1-hydroxycycloalkyl group, the preferred types are those having five or six ring carbons, including lower-alkylated derivatives thereof, although larger rings having seven or eight ring carbons are also considered part of the invention. Illustrative of the group R' when 1-hydroxycycloalkyl are the following: 1-hydroxycyclopentyl, 1-hydroxycyclohexyl, 1-hydroxycycloheptyl, 1-hydroxycyclooctyl, 2-methyl-1-hydroxycycloheptyl, 3-methyl-1-hydroxycyclohexyl, 3,4-dimethyl-1-hydroxycyclohexyl, 4-methyl-1-hydroxycyclooctyl, and the like.

The new alkamine esters of α-(Δ¹-cycloalkenyl)-β-hydroxy-aliphatic acids are prepared by esterification of the corresponding acids, R'—CH(R)—COOH. The acids themselves are prepared in the following general manner: the acid, RCH₂COOH, or a metallic salt thereof, is caused to react with an alkyl-magnesium halide to produce an organometallic derivative, XMgCH(R)—COOM, where X is halogen and M is a cation. The cation M is a simple metal ion if a salt of the acid is used as the starting material, and is halomagnesium if the free acid is used. The organometallic complex when reacted with an aldehyde or a ketone, gives, after hydrolysis, the desired α-(Δ¹-cycloalkenyl)-β-hydroxyaliphatic acid. The reaction of the organometallic complex and the carbonyl compound is carried out in a solvent inert under the conditions of the reaction, e.g., ether, benzene, toluene, or the like, preferably at a temperature between about 20° and 100° C.

The α-(Δ¹-cycloalkenyl)-β-hydroxy-aliphatic acid is converted to the alkamine esters of the invention by the following method: the acid, R'—CH(R)—COOH, or a metallic salt thereof, is heated with a tertiary-aminoalkyl halide of the formula Z—Y—N=B, where Z is halogen (preferably chlorine or bromine). The temperature at which the reactants are heated is preferably between about 50° C. and 150° C., and it preferred to use an organic or aqueous-organic solvent which is inert under the conditions of the reaction. If the free acid is used, the basic ester is obtained in the form of its hydrohalide salt which can be converted to the alkamine ester in base form by the addition of alkali, e.g., sodium hydroxide or sodium carbonate, to the reaction mixture. If a metallic salt of the acid is used, the free base form of the ester is obtained directly.

These new alkamine esters are most conveniently used in the form of water-soluble acid-addition or quaternary ammonium salts, and these salts are within the purview of the invention. Pharmacological evaluation of these new compounds in the form of their water-soluble nontoxic salts by the Magnus method has indicated their usefulness as antispasmodic agents. They can be prepared for use and administered as antispasmodic agents in the same way as other natural or synthetic antispasmodics, such as atropine sulfate, adiphenine hydrochloride, and the like. The acids which can be used to prepare acid-addition salts are those which produce when combined with the alkamine esters, salts whose anions are relatively innocuous to the animal organism in therapeutic doses of the salts, so that the beneficial physiological properties inherent in the basic esters are not vitiated by side-effects ascribable to the anions. Appropriate acid-addition salts are those derived from mineral acids such as hydrochloric acid, hydrobromic acid, hydriodic acid and sulfuric acid; and organic acids such as acetic acid, citric acid and tartaric acid. The quaternary ammonium derivatives are obtained by the addition of alkyl, alkenyl or aralkyl esters of inorganic acids or organic sulfonic acids, including such compounds as methyl chloride, methyl bromide, methyl iodide, ethyl bromide, propyl chloride, benzyl chloride, benzyl bromide, methyl sulfate, methyl benzenesulfonate and methyl p-toluenesulfonate.

The following examples will further illustrate the invention, without the latter being limited thereby.

EXAMPLES (a) *α-(Δ¹-cyclohexenyl)-α-(1-hydroxycyclohexyl)acetic acid*

To the stirred Grignard reagent obtained from 10.7 v. of magnesium, 100 cc. of ether, 1 cc. of isopropyl bromide and 50 cc. of isopropyl chloride, there was added 300 cc. of ether and then, dropwise, 27.2 g. (0.20 mole) of Δ¹-cyclohexenylacetic acid dissolved in 100 cc. of benzene. After the addition of 200 cc. of ether, the reaction mixture was refluxed for eighteen hours, cooled to room temperature, and 23.5 g. (0.24 mole) of cyclohexanone dissolved in 100 cc. of ether was added. The mixture was refluxed for four hours and then poured into 400 cc. of stirred ice-cold 10% ammonium chloride solution. The ether layer was separated, extracted with ammonium chloride solution, and the combined aqueous solutions were washed with ether and then acidified to Congo red with dilute sulfuric acid. The oily precipitate, which solidified when stirred, was collected by filtration and recrystallized from petroleum ether (B.P. 90–100° C.), giving α-(Δ¹-cyclohexenyl)-α-(1-hydroxycyclohexyl)-acetic acid, M.P. 131–132° C.

*Analysis.*—Calcd. for $C_{14}H_{22}O_3$: C, 70.55; H, 9.31. Found: C, 70.57; H, 9.38. Neut. equiv. calcd.: 238.3. Found: 237.6.

(b) *2-diethylaminoethyl α-(Δ¹-cyclohexenyl)-α-(1-hydroxycyclohexyl)acetate*

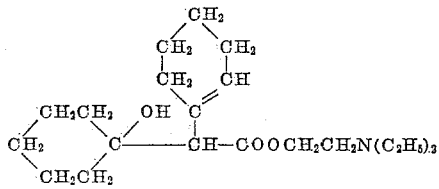

To a stirred, refluxing mixture of 9.5 g. (0.04 mole) of α-(Δ¹-cyclohexenyl)-α-(1-hydroxycyclohexyl)acetic acid and 60 cc. of isopropyl alcohol, there was added, dropwise, during the period of one hour, 5.34 g. (0.04 mole) of 2-diethylaminoethyl chloride, dissolved in 5 cc. of benzene. The mixture was refluxed for eight hours, filtered, 60 cc. of ether was added to the filtrate which was then cooled to 0° C. The crystalline product which separated was collected by filtration and recrystallized from isopropyl alcohol, giving 2-diethylaminoethyl α-(Δ¹-cyclohexenyl) - α - (1 - hydroxycyclohexyl)acetate in the form of its hydrochloride salt, M.P. 148–149° C.

*Analysis.*—Calcd. for $C_{20}H_{35}NO_3 \cdot HCl$: C, 64.23; H, 9.72; Cl, 9.48. Found: C, 64.25; H, 9.76; Cl, 9.62.

The hydrochloride salt of 2-diethylaminoethyl α-(Δ¹-cyclohexenyl)-α-(1-hydroxycyclohexyl)acetate was found to have an antispasmodic activity about 94% that of atropine sulfate when tested by the modified Magnus method [Luduena and Lands, J. Pharmacol. and Exptl. Therap. 110, 282 (1954)].

(c) A sample (about 2 g.) of the hydrochloride salt of 2-diethylaminoethyl α-(Δ¹-cyclohexenyl)-α-(1-hydroxycyclohexyl)acetate was treated with cold aqueous sodium carbonate, slightly in excess of that necessary to neutralize the hydrochloride salt. The resulting free basic ester, 2-diethylaminoethyl α-(Δ¹-cyclohexenyl)-α-(1-hydroxycyclohexyl)acetate, was extracted with ether, the ether solution dried and a large excess of methyl bromide was passed through the solution at room temperature. After twenty-four hours at room temperature and 24–48 hours at 0° C., the crystalline product which had separated was collected by filtration and recrystallized from an isopropyl alcohol-isopropyl ether mixture, giving 2-diethylaminoethyl α-(Δ¹ - cyclohexenyl)-α-(1-hydroxycyclohexyl)acetate in the form of its methobromide salt, M.P. 185–187° C. with decomposition.

*Analysis.*—Calcd. for $C_{21}H_{38}O_3NBr$: C, 58.33; H, 8.85; Br, 18.48. Found: C, 58.40; H, 8.96; Br, 18.34.

The methobromide salt of 2-diethylaminoethyl α-(Δ¹-cyclohexenyl)-α-(1-hydroxycyclohexyl)acetate was found to have an antispasmodic activity about 106% that of atropine sulfate when tested by the modified Magnus method.

By substitution in part (c) of the above example of the methyl bromide by hydrobromic acid, hydriodic acid, sulfuric acid, phosphoric acid, benzenesulfonic acid, methyl iodide, ethyl bromide, allyl bromide, methyl sulfate, benzyl chloride, or p-nitrobenzyl bromide, there can be obtained 2-diethylaminoethyl α-(Δ¹-cyclohexenyl)-α-(1-hydroxycyclohexyl)acetate in the form, respectively, of its hydrobromide, hydriodide, sulfate (or bisulfate), phosphate (or acid phosphate), benzenesulfonate, methiodide, ethobromide, allobromide, methosulfate, benzochloride, or p-nitrobenzobromide salt.

By substitution in part (a) of the above example of the Δ¹-cyclohexenylacetic acid by a molar equivalent amount of Δ¹-cyclopentenylacetic acid, 5-methyl-Δ¹-cyclohexenylacetic acid, 4-isopropyl-Δ¹-cyclohexenylacetic acid, or 2,3,3-trimethyl-Δ¹-cyclopentenylacetic acid (β-campholenic acid), followed by the procedural steps outlined in parts (a) and (b) of the example, there can be obtained, respectively, 2-diethylaminoethyl α-(Δ¹-cyclopentenyl)-α-(1-hydroxycyclohexyl)acetate, 2 - diethylaminoethyl α-(5-methyl - Δ¹ - cyclohexenyl)-α-(1-hydroxycyclohexyl)acetate, 2-diethylaminoethyl α-(4-isopropyl-Δ¹-cyclohexenyl)-α-(1-hydroxycyclohexyl)acetate, or 2-diethylaminoethyl α-(2,3,3 - trimethyl-Δ¹-cyclopentenyl)-α-(1-hydroxycyclohexyl)acetate.

By substitution in part (a) of the above example of the cyclohexanone by molar equivalent amounts of cyclopentanone, formaldehyde, acetaldehyde, acetone, methylethyl ketone, butyraldehyde, dipropyl ketone, dibutyl ketone, 1-hexanone, 4-methylcyclohexanone, or cycloheptanone, followed by the procedural steps outlined in parts (a) and (b) of the example, there can be obtained, respectively, 2-diethylaminoethyl α-(Δ¹-cyclohexenyl) - α - (1 - hydroxycyclopentyl)acetate, 2-diethylaminoethyl α-(Δ¹-cyclohexenyl)-β-hydroxypropionate, 2-diethylaminoethyl α-(Δ¹-cyclohexenyl)-β-hydroxybutyrate 2 - diethylaminoethyl α-(Δ¹-cyclohexenyl)-β-hydroxy-β-methylbutyrate, 2-diethylaminoethyl α-(Δ¹-cyclohexenyl)-

β-hydroxy-β-methylvalerate, 2-diethylaminoethyl α-(Δ¹-cyclohexenyl)-β-hydroxycaproate, 2-diethylaminoethyl α-(Δ¹-cyclohexenyl)-β-hydroxy-β-propylcaproate, 2 - diethylaminoethyl α-(Δ¹ - cyclohexenyl)-β-hydroxy-β-butylenanthate, 2-diethylaminoethyl α-(Δ¹-cyclohexenyl)-β-hydroxycaproate, 2-diethylaminoethyl α-(Δ¹-cyclohexenyl)-α-(1-hydroxy-4-methylcyclohexyl)acetate, or 2-diethylaminoethyl α - (Δ¹ - cyclohexenyl)-α-(1-hydroxycycloheptyl)acetate.

By substitution in part (b) of the above example of 2-diethylaminoethyl chloride by a molar equivalent amount of 3-dimethylaminopropyl bromide, 2-dimethylamino-2-methylethyl chloride, 2-dibutylaminoethyl chloride, methylethylaminoethyl cholride, 5-diethylaminopentyl chloride, 2-dihexylaminoethyl chloride, 2-(1-piperidyl)ethyl chloride, 2-(1-pyrrolidyl)ethyl chloride, 2-(4-morpholinyl)ethyl chloride, 2 - (2,6-dimethyl-1-piperidyl)ethyl chloride, or 2-(3-methyl-1-pyrrolidyl)methyl chloride, there can be obtained, respectively, 3-dimethylaminopropyl α-(Δ¹-cyclohexenyl)-α-(1-hydroxycyclohexyl)acetate, 2-dimethylamino-2-methylethyl α-(Δ¹-cyclohexenyl)-α-(1-hydroxycyclohexyl)acetate, 2-dibutylaminoethyl α-(Δ¹-cyclohexenyl)-α-(1-hydroxycyclohexyl)acetate, methylethylaminoethyl α-(Δ¹ - cyclohexenyl)-α-(1-hydroxycyclohexyl)acetate, 5-diethylaminopentyl α-(Δ¹-cyclohexenyl)-α-(1-hydroxycyclohexyl)acetate, 2 - dihexylaminoethyl α-(Δ¹-cyclohexenyl)-α-(1 - hydroxycyclohexyl)acetate, 2-(1-piperidyl)ethyl α-(Δ¹-cyclohexenyl)-α-(1-hydroxycyclohexyl)acetate, 2-(1-pyrrolidyl)ethyl α-(Δ¹-cyclohexenyl)-α-(1-hydroxycyclohexyl)acetate, 2 - (4-morpholinyl)ethyl α-(Δ¹-cyclohexenyl)-α-(1 - hydroxycyclohexyl)acetate, 2-(2,6-dimethyl-1-piperidyl)ethyl α-(Δ¹-cyclohexenyl)-α-(1 - hydroxycyclohexyl)acetate, or 2-(3-methyl-1-pyrrolidyl)methyl α-(Δ¹-cyclohexenyl)-α-(1-hydroxycyclohexyl)acetate.

I claim:

1. A member of the group consisting of (A) a tertiary-amino-lower-alkyl ester of an α-(Δ¹-cycloalkenyl)-β-hydroxy-aliphatic acid, in which the cycloalkenyl group has five-six ring carbons, and the aliphatic acid is one of from three to about twelve carbon atoms selected from the group consisting of alkanoic and α-cycloalkylacetic acids in which the cycloalkyl radical has five-eight ring carbons; (B) pharmacologically acceptable acid-addition salts thereof; and (C) pharmacologically acceptable quaternary ammonium salts thereof.

2. A di-lower-alkylamino-lower-alkyl ester of an α-(Δ¹-cycloalkenyl)-β-hydroxy-lower-alkanoic acid in which the cycloalkenyl radical has five-six ring carbons.

3. A pharmacologically acceptable acid-addition salt of a di-lower-alkylamino-lower-alkyl ester of an α-(Δ¹-cycloalkenyl)-α-(1-hydroxycycloalkyl)acetic acid in which the cycloalkenyl radical has five-six ring carbons and the cycloalkyl radical has five-eight ring carbons.

4. A di-lower-alkylamino-lower-alkyl ester of an α-(Δ¹-cyclohexenyl)-β-hydroxy-lower-alkanoic acid.

5. A pharmacologically acceptable quaternary ammonium salt of a di-lower-alkylamino-lower-alkyl ester of an α-(Δ¹ - cycloalkenyl) - α - (1-hydroxycycloalkyl)acetic acid in which the cycloalkenyl radical has five-six ring carbons and the cycloalkyl radical has five-eight ring carbons.

6. A pharmacologically acceptable acid-addition salt of 2-diethylaminoethyl α-(Δ¹-cyclohexenyl)-α-(1-hydroxycyclohexyl)acetate.

7. A pharmacologically acceptable quaternary ammonium salt of 2-diethylaminoethyl α-(Δ¹-cyclohexenyl)-α-(1-hydroxlcyclohexyl)acetate.

8. 2 - diethylaminoethyl α-(Δ¹-cyclohexenyl)-α-(1-hydroxycyclohexy)acetate hydrochloride.

9. 2 - diethylaminoethyl α-(Δ¹-cyclohexenyl)-α-(1-hydroxycyclohexyl)acetate methobromide.

10. The process for the preparation of a tertiary-amino-lower-alkyl ester of an α-(Δ¹-cycloalkenyl)-β-hydroxy-aliphatic acid, in which the cycloalkenyl group has five-six ring carbons, and the aliphatic acid is one of from three to about twelve carbon atoms selected from the group consisting of alkanoic and α-cycloalkylacetic acids, which comprises reacting a member of the group consisting of α-(Δ¹-cycloalkenyl)acetic acids and metallic salts thereof with a lower-alkylmagnesium halide, reacting the resulting halomagnesium derivative of a salt of a Δ¹-cycloalkenylacetic acid with a member of the group consisting of lower alanones and cycloalkanones in an inert solvent, hydrolyzing the reaction mixture, and reacting the resulting α-(Δ¹-cycloalkenyl)-β-hydroxy-aliphatic acid, or a metallic salt thereof, with a tertiary-amino-lower-alkyl halide in an inert solvent at a temperature between about 50° C. and 150° C.

11. The process for the preparation of a di-lower-alkylamino-lower-alkyl ester of an α-(Δ¹-cycloalkenyl)-α-(1-hydroxycycloalkyl)acetic acid in which the cycloalkenyl radical has five-six ring carbons and the cycloalkyl radical has five-eight ring carbons, which comprises reacting an α-(Δ¹-cycloalkenyl)acetic acid with a lower-alkylmagnesium halide, reacting the resulting halomagnesium derivative of a salt of a Δ¹-cycloalkenylacetic acid with a cycloalkanone in an inert solvent, hydrolyzing the reaction mixture, and reacting the resulting α-(Δ¹-cycloalkenyl)-α-(1-hydroxycycloalkyl)acetic acid with a di-lower-alkylamino-lower-alkyl halide in an inert solvent at a temperature between about 50° C. and 150° C.

12. The process for the preparation of 2-diethylaminoethyl α-(Δ¹ - cyclohexenyl)-α-(1-hydroxycyclohexyl)acetate which comprises reacting α-(Δ¹-cyclohexenyl)acetic acid with a lower-alkylmagnesium halide, reacting the resulting halomagnesium derivative of a salt of Δ¹-cyclohexenylacetic acid with cyclohexanone in an inert solvent, hydrolyzing the reaction mixture, and reacting the resulting α-(Δ¹-cyclohexenyl)-α-(1-hydroxycyclohexyl)acetic acid with a 2-diethylaminoethyl halide in an inert solvent at a temperature between about 50° C. and 150° C.

References Cited in the file of this patent

UNITED STATES PATENTS

| | | |
|---|---|---|
| 2,265,184 | Miescher et al. | Dec. 9, 1941 |
| 2,538,795 | Moffett et al. | Jan. 23, 1951 |

OTHER REFERENCES

Blicke et al.: J. Am. Chem. Soc., 74, 1730–1733.
Blicke et al.: J. Am. Chem. Soc., 77, 5399 to 5401, 5403 to 5405 (1955).

UNITED STATES PATENT OFFICE

Certificate of Correction

June 2, 1959

Patent No. 2,889,353

Frederick F. Blicke

It is hereby certified that error appears in the printed specification of the above numbered patent requiring correction and that the said Letters Patent should read as corrected below.

Column 1, line 57, for "Δ¹-cloclopentenyl" read —Δ¹-cyclopentenyl—; column 3, line 39, for "v. of magnesium" read —g. of magnesium—; column 5, line 6, for "droxycaproate" read —droxycaprate—; column 6, line 1, for "acid-addiion" read —acid-addition—; line 6, for "α-(1-hydroxlcyclohexyl)acetate" read —α-(1-hydroxycyclohexyl)acetate—; line 8, for "droxycyclohexy)acetate" read —droxycyclohexyl)acetate—; line 22, for "alanones" read —alkanones—.

Signed and sealed this 13th day of October 1959.

[SEAL]

Attest:
KARL H. AXLINE,
Attesting Officer.

ROBERT C. WATSON,
Commissioner of Patents.